United States Patent
Kasetty et al.

(10) Patent No.: US 6,226,156 B1
(45) Date of Patent: May 1, 2001

(54) MAGNETIC READ/WRITE HEAD ACTUATOR ASSEMBLY HAVING AN ACTUATOR MOTOR WITH DUAL WINDINGS

(75) Inventors: Kumaraswamy Kasetty, Northboro; He Huang, Shrewsbury, both of MA (US)

(73) Assignee: Quantum Corp., Milpitas, CA (US)

(*) Notice: Subject to any disclaimer, the term of this patent is extended or adjusted under 35 U.S.C. 154(b) by 0 days.

(21) Appl. No.: 09/118,475

(22) Filed: Jul. 17, 1998

(51) Int. Cl.[7] .................................................. G11B 5/55
(52) U.S. Cl. ............................................................ 360/265
(58) Field of Search .................................. 360/104–106, 360/109, 265, 266, 256.2, 264.9

(56) References Cited

U.S. PATENT DOCUMENTS

| | | | |
|---|---|---|---|
| 4,979,062 | 12/1990 | Stefansky et al. | 360/97.02 |
| 5,295,031 | * 3/1994 | Wasson | 360/106 |
| 5,621,591 | * 4/1997 | Rahimi et al. | 360/260 |
| 5,666,244 | * 9/1997 | Ogawa | 360/260 |
| 5,764,441 | * 6/1998 | Aruga et al. | 360/106 |
| 5,805,388 | * 9/1998 | Engwall | 360/106 |

* cited by examiner

*Primary Examiner*—Allen T. Cao
(74) *Attorney, Agent, or Firm*—Henry Groth

(57) ABSTRACT

An improved magnetic read/write head actuator assembly for use within a storage disk system that provides reduced average access time. The actuator assembly includes an actuator arm mounted on a pivotal E-block structure. A read/write head is supported at a distal end of the actuator arm such that the head is positioned in close proximity to a rotating magnetic storage disk. An actuator motor cooperates with the E-block structure to provide pivotal motion to the actuator arm about a central pivot axis. The actuator motor includes a pair of rotor windings connected to the E-block structure at an end opposite the actuator arm and stator magnet structure that is statically mounted in close proximity to the rotor windings. The actuator motor further includes a flux conductive member for forming a closed magnetic flux path through the windings and the stator magnets. The pair of rotor winding are oriented in a plane normal to the plane defined by the pivotal angular motion of the actuator assembly. The geometry of the actuator motor windings together with their orientation generates an increased magnetic torque vector force. This increased torque vector force generated by the windings is transposed to the E-block structure for increasing the pivotal speed of the actuator arm about the central pivot axis with no increase in power consumption.

20 Claims, 4 Drawing Sheets

MAGNETIC READ/WRITE HEAD ACTUATOR ASSEMBLY HAVING AN ACTUATOR MOTOR WITH DUAL WINDINGS

CROSS-REFERENCE TO RELATED PATENTS

This invention is related to the disclosure of the following patent of which is assigned to the assignee of this application as of the date of filing: U.S. Pat. No. 5,621,590, entitled, "Actuator Apparatus With Plastic C-Block" to Pace et al.; U.S. Pat. No. 5,883,761, entitled, "An Improved Magnetic Read/Write Head Actuator Assembly" the disclosures thereof being incorporated herein by reference.

FIELD OF THE INVENTION

The invention relates generally to a magnetic read/write head actuator or positioner assembly for a disk drive and more precisely to a magnetic read/write head actuator assembly having a voice coil motor with dual coils.

BACKGROUND OF THE INVENTION

In disk-type magnetic recording systems for digital applications, magnetic transducer elements, or heads, are used to record information onto (i.e., write) or retrieve information from (i.e., read) the disk surface or surfaces. Each storage disk comprises an annular substrate onto which is deposited a magnetic recording medium. Each disk surface is divided into thousands of concentric, annular bands, or "tracks" each having a predetermined radial extent. Each head is supported in close proximity to an associated disk surface by a head positioning assembly, or actuator, that supports the head near the disk surface and moves it from one radial position to another, thereby permitting use of a single head for reading and writing along multiple concentric tracks. The positioner assembly for each head or group of heads includes an actuator arm and an actuator motor. The actuator motor moves the actuator arm, to change the position of the head with relation to the tracks on the disk. A disk drive may include a plurality of stacked disks, and one actuator motor may be used to move a corresponding number of actuator arms in unison.

Positioner assemblies of the prior art typically consist of several arms, in spaced apart relationship, stacked one above the other, pivoted at their centers on a common pivot, with read/write heads mounted at one end and the moving winding of the rotor of the actuator motor mounted at the other. The stator portion of the motor includes permanent magnets for the actuator motor as well as a flux return path that is typically formed of steel. The winding acts as a magnetic field generator as well as a counterweight to balance the heads and the actuator arms.

During operation, the positioner assembly provides high speed disk file access by positioning the read/write heads in a transducing relationship with a rotating magnetic storage disk. Such operation requires, first, that the position of the read/write head relative to a track on the disk be maintained within extremely close tolerances; and, second, that the access time (that is, the time required to move the head from one track to another desired track) be short. The state of the art concerning the first requirement necessitates that a control system, preferably utilizing feedback, be employed to sense the deviation of the position of the head from an optimum read/write position over the track, and to generate a correction signal for driving the actuator motor. A short access time, on the other hand, requires a number of different considerations such as the voice coil motor design, the moving mass, and inertia of the positioner and heads. Additionally, access time depends on the actuator assembly's structural design as well as the servo control algorithm employed for controlling the positioning of the actuator assembly.

One alternative for minimizing disk file access time is to increase the torque of the actuator motor for increasing the acceleration and deceleration of the positioner assembly. However, in order to increase the torque of an actuator motor, a proportional increase in overall motor size is required. Another alternative for increasing the acceleration and deceleration of the positioner assembly is to increase the magnitude of the current profiles supplied to the actuator motor windings. Both of the above described methods increase the acceleration and deceleration of the positioner assembly, however, both method cause an undesirable increase in power consumption.

Thus, a hitherto unsolved need has remained for an actuator motor that reduces average access time to a disk file storage system with no increase in power consumption and motor size.

SUMMARY OF THE INVENTION

The improved actuator assembly includes an actuator motor having a pair of rotor windings connected to a pivotal E-block structure. An actuator arm is mounted on a hub-arm portion of the E-block structure so that the actuator arm can rotate over a limited angular range with respect to a rotating magnetic storage disk, e.g., plus or minus 20-degrees. A read/write head is mounted at a distal end of the actuator arm such that the head may be positioned over and in close proximity to the rotating storage disk. The actuator motor further includes one or more statically mounted stator magnets positioned in close proximity to the pair of rotor windings. A magnetic flux conductive member is also statically positioned adjacent to the stator magnets for providing a closed magnetic flux return path through the rotor windings and the stator magnet structure. The actuator motor cooperates with the actuator assembly for pivoting the actuator arm over the limited angular range.

The pair of rotor windings are positioned orthogonal to a plane defined by the pivotal motion of the actuator arm. Furthermore, the pair of rotor windings are separated by a predetermined angular distance and are aligned along a longitudinal axis defined to extend through the central pivot axis of the actuator assembly. The pair of rotor windings, in this orientation, provides approximately the maximum longitudinal winding-length substantially parallel with each longitudinal axis. This maximum winding-length defined on each longitudinal axis maximizes the torque vector force generated by the pair of rotor windings and results in increased pivotal speed of the actuator assembly.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 2 (b) is a cross-sectional view of conventional voice coil motor of a magnetic read/write head actuator assembly.

FIG. 3 (b) is a cross-sectional view of a voice coil motor of a magnetic read/write head actuator assembly of the present invention.

FIG. 4 (b) is a portion of the FIG. 4 (a) conventional magnetic read/write head actuator assembly illustrating vector forces generated by the winding.

FIG. 5 (b) is a portion of the FIG. 5 (a) magnetic read/write head actuator assembly illustrating vector forces generated by the winding.

DETAILED DESCRIPTION OF A PREFERRED EMBODIMENT

Figure 1:
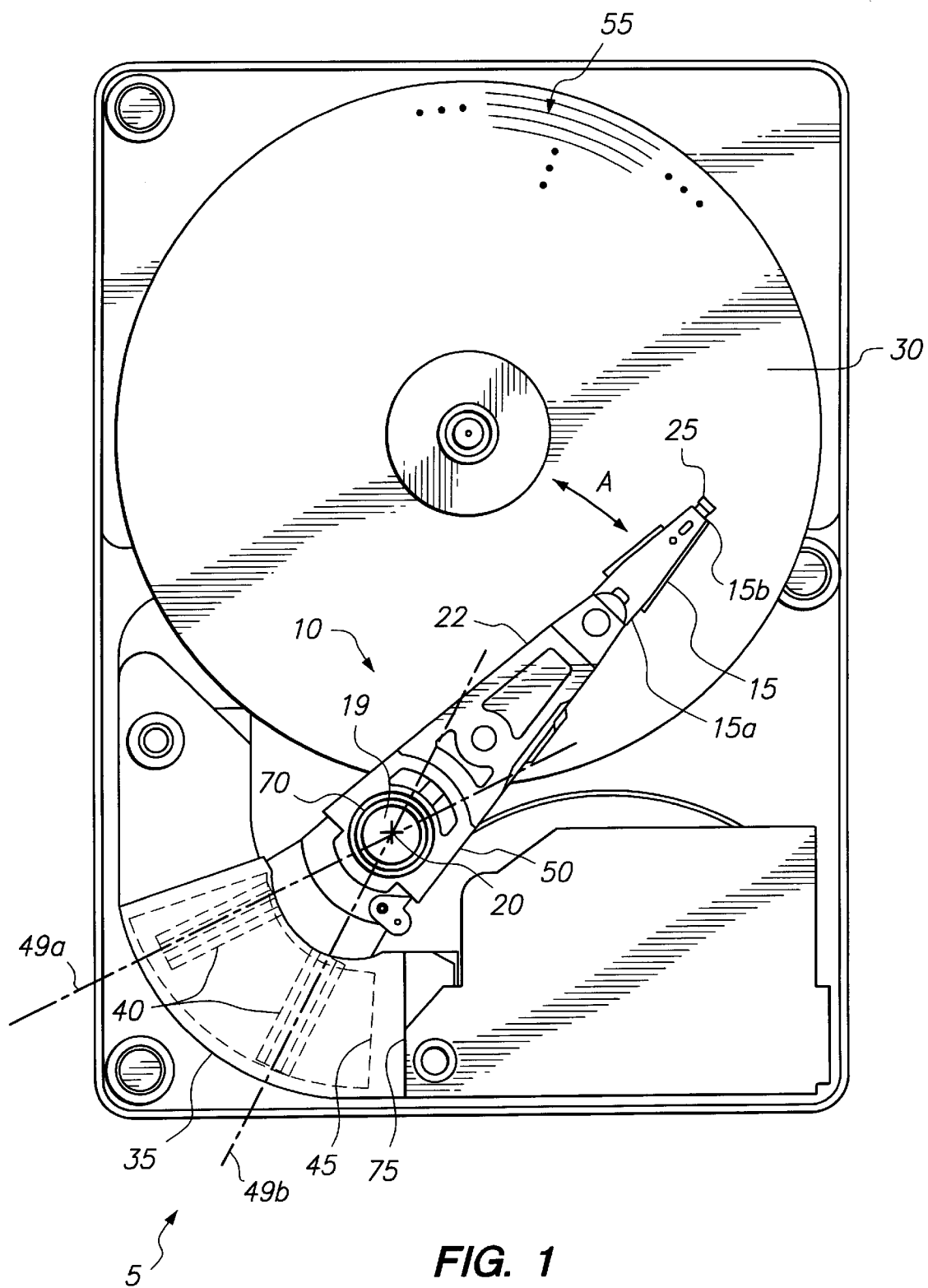
FIG. 1 is a plan view of a magnetic storage disk system having principles of the present invention.
Figure 2A:
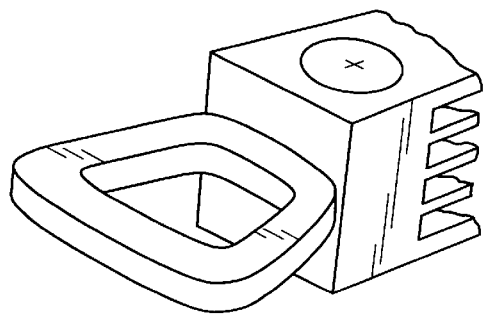
FIG. 2 (*a*) is an isometric view showing a portion of a conventional magnetic read/write head actuator assembly.
Figure 3A:
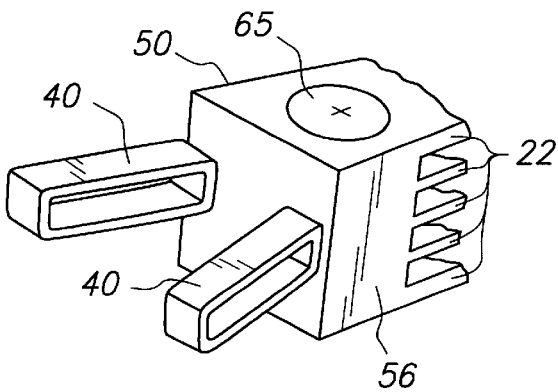
FIG. 3 (a) is an isometric view showing a portion of magnetic read/write head actuator assembly having principles of the present invention.
Figure 2B:
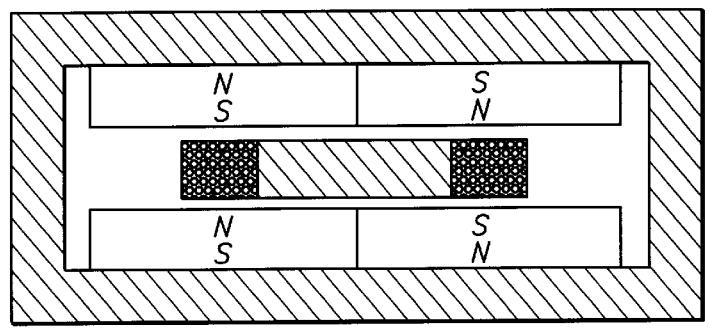
Figure 3B:
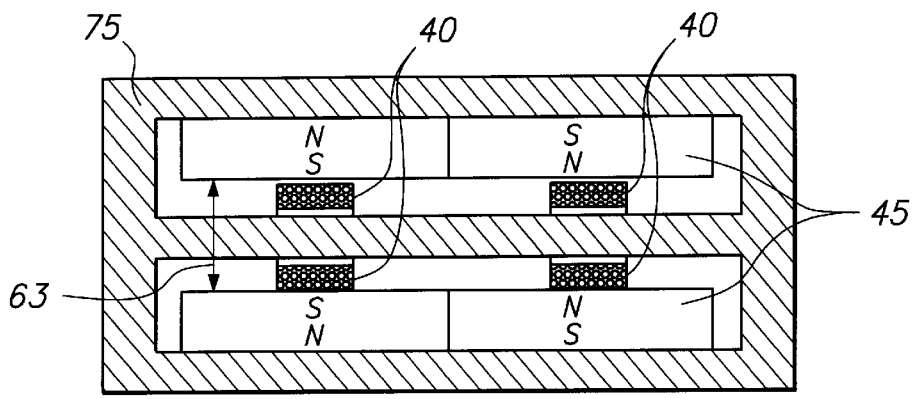
Figure 4A:
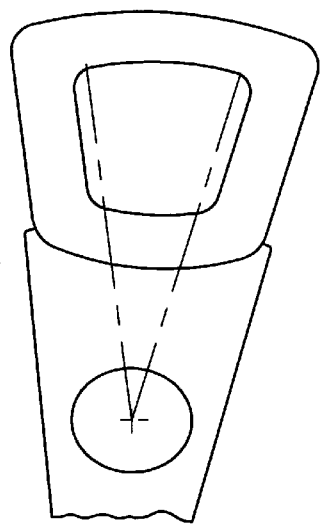
FIG. 4 (a) is a plan view of the FIG. 2 (a) conventional magnetic read/write head actuator assembly portion.
Figure 4B:
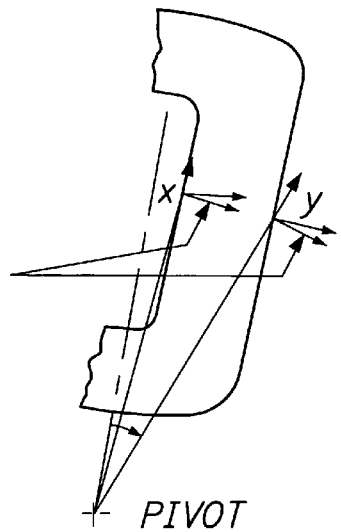

Referring to FIGS. 1, 3(a) and 3(b), one preferred embodiment of the present invention as set forth herein is a disk drive 5 having an improved magnetic read/write head actuator assembly 10. The improved actuator assembly 10 of the present invention includes an actuator motor 35 having a pair of rotor windings 40 mounted on a pivotal E-block 50 structure. Furthermore, the actuator motor has a stator magnet 45 structure statically mounted in close proximity to the pair of rotor windings 40. Finally, the actuator motor assembly includes a rigid flux conductive member 75 that facilitates a closed magnetic flux return path via the stator magnets 45 and the pair of rotor windings 40. Each rotor winding 40 is positioned on a separate longitudinal axis 49a and 49b defined to extend through the central pivot axis 20. The pair of rotor windings 40 provides the magnetic read/write actuator assembly 10 with an increased torque vector force. This increased torque vector force realized by the pair of rotor windings 40 is transposed to the actuator arm 15 for increasing the pivotal speed of the actuator arm 15 about the central pivot axis 20.

The actuator arm 15 is mounted on a hub-arm portion 22 of the E-block structure 50. A read/write head 25 is supported at a distal end 15b of the actuator arm such that the head 25 is positioned over and in close proximity to a rotating magnetic storage disk 30. In particular, the E-block 50 structure pivots to position the read/write heads 25 over a multiplicity of data tracks 55 defined on the surface of the rotating storage disk 30. Thus, the actuator motor 35 cooperates with the E-block 50 structure to provide pivotal motion to the magnetic read/write head actuator assembly 10 about the central pivot axis 20.

More precisely, the E-block 50 structure includes a central hub portion 56 and the hub-arm portion 22 which extends outwardly from the central hub portion 56. The central hub portion 56 further has a central bore 65 therethrough for accepting a mounting means such as a shaft (not shown). More preferably, the central hub 56 is mounted on a cartridge having ball bearings 70 therein that act as the pivot, about which the E-block 50 structure rotates over a predetermined limited angular range. The E-block 50 structure is comprised of a light-weight aluminum alloy that is sturdy and receptive to machining. A first end of the actuator arm 15a is mounted on the hub-arm portion 22 of the E-block 50 and the read/write head 25 is mounted at a distal end 16b of the actuator arm 15 so that the read/write head 25 is positioned in close proximity to the rotating storage disk 30.

In accordance with principles of the present invention, the pair of rotor windings 40 are securely mounted on the E-block 50 structure and are positioned generally opposite the hub-arm portion 22. Moreover, the pair of rotor windings 40 are wound of an electrically conductive material with minimal cross section for reducing heating effects. Preferably the pair of rotor windings 40 are wound of copper or aluminum wire. Furthermore, the rotor windings 40 are oriented orthogonal to the plane defined by the pivotal motion of the actuator arm and are separated by a predetermined angular distance. A preferred range of angular distances is from approximately 46-degrees to approximately 180-degrees. The pair of rotor windings are driven with electric current such that each coil conducts current in an opposite direction with respect to the other. This conduction of current in opposite directions by each winding generates a torque vector force in a common direction about the central pivotal axis 20. Consequently, each rotor winding 40 contributes a portion of the total torque vector force that is transposed to the actuator assembly 10 for pivoting the assembly about the central pivot axis 20. Additionally, by conducting current in opposite direction as described above, the pair of rotor windings 40 reduces the total inductance of the actuator motor 35. This reduction in actuator motor 35 inductance provides an actuator motor 35 that can react faster to current reversals that occur when the actuator assembly 10 is accelerating and decelerating.

The stator magnet 45 structure, as shown in FIG. 3(b), is dimensioned to have a substantially flat planar geometry. The flat planar surfaces of the magnets are oriented to substantially align and face each other and to form a small gap 63 therebetween. The pair of rotor windings 40 are positioned in this gap 63 formed by the stator magnets 45. The electric current flowing through each of the rotor windings 40 interacts with the magnetic field generated by the stator magnets 45 and generates a torque vector force, which in turn, is translated to the E-block 50 for pivoting the actuator assembly 10. Additionally, the flux conductive member 75 includes a segment of flux conductive material, which is an integral portion of the member, that is positioned in the gap 63 defined between the stator magnets 45. This portion of the flux conductive member 75 positioned in the gap 63 is surrounded by the pair of rotor windings 40 for providing the closed magnetic flux return path previously described. The flux conductive member 75 may be comprised of any one of a plurality of rigid magnetically conductive materials or alloys, however, one preferable material for the flux conductive member 75 is steel.

During operation, the improved magnetic read/write head actuator assembly 10 as set forth above positions a read/write head 25 relative to a surface of a rotating storage disk 30 with minimal average access time. The actuator assembly 10 reduces access time by increasing the actuator motor's 35 torque vector force when the disk drive storage system 5 is accessing data tracks 55 defined on the storage disk 30.

Figure 5A:
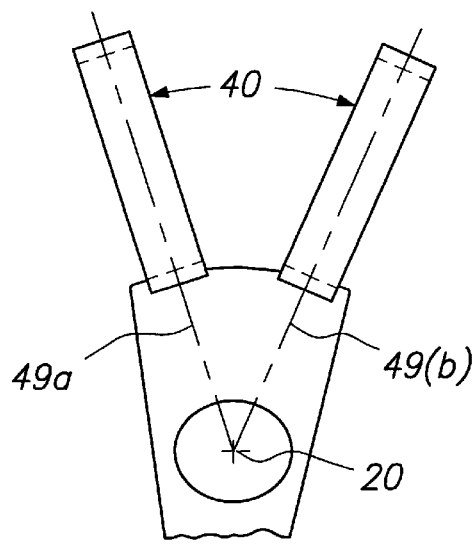
FIG. 5 (a) is a plan view of the FIG. 3 (a) magnetic read/write head actuator assembly portion.
Figure 5B:
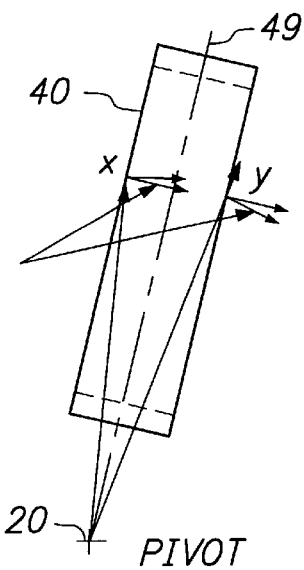

Referring to FIGS. 5(a) and 5(b), the actuator motor's 35 torque vector force is increased by increasing the effective longitudinal length of each motor winding 40 defined along the longitudinal axes 49(a) and 49(b), which as previously described, extends through each rotor winding 40 and the central pivot axis 20. A further principle of the present invention is realized in that any portion of the windings 40 that are not defined along either of the longitudinal axes 49(a) or 49(b) are minimized in length and area to provide a reduction in winding 40 resistance as well as a reduction in detrimental inertia. This reduction of inertia provides increased acceleration/deceleration for the actuator assembly 10. The reduction in winding resistance, as previously described, reduces power losses associated with the pair of windings 40.

The increased longitudinal length of the rotor windings 40 that are positioned along the longitudinal axis 49(a) and 49(b) react with the magnetic field to generate the majority of the torque vector force transposed to the actuator arm 15. Since this winding-portion has a longer longitudinal length as well as a greater surface area for reacting with the magnetic field generated by the stator magnets 45, this winding-portion will generate a greater torque vector force. Therefore, the geometry of each of the rotor windings 40 along with the relative positioning of the windings 40 provides maximum winding-length parallel with the longitudinal axis 49(a) and 49(b), thereby minimizing inertia exerted on the central pivot axis 20 and maximizing the pivotal speed of the actuator assembly 10.

The reactionary forces exerted on the bearing 70 by the windings 40 are also minimized by positioning the windings at the greatest possible angular separation, e.g. 180-degrees. In this orientation, the windings generate their maximum torque according to principles of the present invention and minimize or eliminate reactionary forces exerted on the bearing 70. The reactionary forces generated by each coil are eliminated due to cancellation thereof by the opposing windings.

By reversing the direction of current flow in each of the rotor windings 40 the torque vector force generated therefrom is likewise reversed. Thus, the actuator assembly 10 of the present invention is bi-directionally pivotal about the central pivot axis 20 with an increased pivotal speed. Therefore, an increase in the pivotal speed of the actuator assembly 10 while accessing data tracks of a storage disk 30 provides a proportional decrease in the access time of storage disk system 50.

Furthermore, the current profiles supplied to the rotor winding 40 of the actuator motor assembly 10 are virtually unchanged. Thus, the actuator motor assembly 35, incorporating principles of the present invention, provides reduced average access time to a storage disk system 5 with no increase in power consumption.

Figure 6:
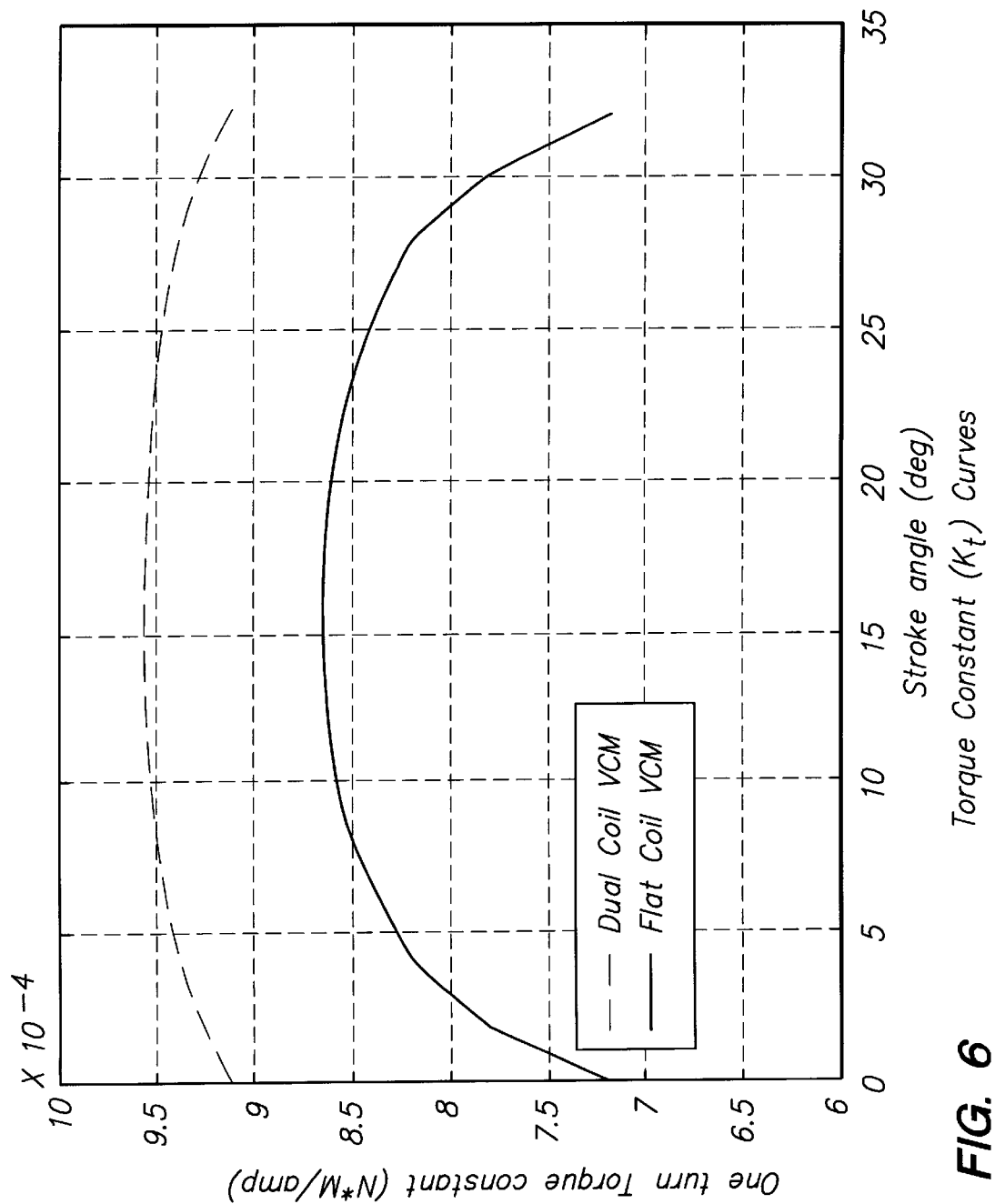
FIG. 6 is a graph illustrating a comparison of torque constants for a magnetic read/write head actuator assembly using principles of the present invention versus a conventional magnetic read/write head actuator assembly.

Referring to FIG. 6, it is desirable to provide an actuator assembly with a flat Kt curve. The Kt curve is a measurement of the torque vector force generated by the actuator assembly 10 over its pivotal angular range or stroke. Providing a uniform torque over the actuator assembly's stroke angle assists in maintaining positional control and servoing of the read/write head 25 on a data track 55 of the rotating storage disk 30. Additionally, the servo control system (not shown) can settle faster when operating with the uniform torque across the stroke. Therefore, this faster settling time of the servo control system provides a reduction in the total average access time of the storage disk system 5.

The magnetic read/write head actuator assembly 10 having principles of the present the invention, as shown in FIGS. 1, 3(a), 3(b), 5(a), and 5(b), provides a Kt curve with greater linearity (shown in dashed lines) over the actuator stroke angle as illustrated in the FIG. 6 graph. The greater linearity is achieved by positioning the longitudinal winding-portions 40 in close proximity to portions of the stator magnets 45 that generate the maximum flux density. Positioning the longitudinal winding-portions 40 in such a manner is enabled by the fact that each winding-portion 40 is physically independent of the other. In comparison, a conventional actuator assembly as shown in FIGS. 2(a), 2(b), 4(a), and 4(b) provides a Kt curve with greater non-linearity (shown in a solid line) over the actuator stroke angle as again illustrated in the FIG. 6 graph.

The above described improved magnetic read/write head actuator assembly 10 has many advantages over the prior art, such as, an increased torque for increasing the pivotal speed of the assembly 10, thereby reducing the average access time to a storage disk system 5. Yet further, the present invention provides a solution for the need for an actuator motor 35 that provides minimized average access time to a storage disk system 5 with no increase in power consumption.

Another advantage of the above magnetic read/write head actuator assembly 10 according to principles of the present invention is an actuator motor having reduced inductance that provides increased reaction to reversals in motor 35 current polarity.

Another advantage of the above magnetic read/write head actuator assembly 10 according to principles of the present invention is an actuator motor 35 having reduced heating.

Yet another advantage of the above magnetic read/write head actuator assembly 10 according to principles of the present invention is an actuator motor having reduced inertia as well as reduced reactionary forces exerted by the actuator motor 35 on the pivot bearing 70, thus reducing the excitation of actuator assembly 10 vibration, which in turn, provides faster servo control settling.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An actuator assembly for positioning a read/write head relative to a surface of a rotating storage disk of a storage disk system, the actuator assembly comprising:

an actuator arm having a distal end for supporting the read/write head over the rotating storage disk, the actuator arm adapted to rotate about a central pivot axis; and an actuator motor including:
  rotor windings including:
    a first rotor winding positioned for maximizing the torque vector force generated by placing the first rotor winding approximately on a first longitudinal axis, the first longitudinal axis extending orthogonally through the central pivot axis; and
    a second rotor winding positioned for maximizing the torque vector force generated by placing the second rotor winding approximately on a second longitudinal axis, the second longitudinal axis extending orthogonally through the central pivot axis;
  a stator magnet structure statically mounted in close proximity to the rotor windings, the stator magnet structure including stator magnets; and
  a magnetic flux conductive member for providing a closed flux return path through the rotor windings and the stator magnet structure.

2. The actuator assembly of claim 1, wherein the rotor windings are oriented approximately orthogonal to pivotal motion of the actuator arm, the pivotal motion being approximately parallel to the rotating storage disk.

3. The actuator assembly of claim 2, wherein the rotor windings are separated in a plane approximately parallel to the rotating storage disk by a predetermined angular distance.

4. The actuator assembly of claim 3, wherein the predetermined angular distance of separation of the rotor windings ranges from approximately 46-degrees to approximately 180-degrees.

5. The actuator assembly of claim 1, wherein the rotor windings have minimized cross section for providing decreased heating.

6. The actuator assembly of claim 1, wherein each rotor winding conducts a current in an opposite direction from the other for generating a torque vector force in a common direction, the current flows approximately orthogonal to pivotal motion of the actuator arm, the pivotal motion being approximately parallel to the rotating storage disk.

7. The actuator assembly of claim 1, wherein:
the first rotor winding has a shape that provides an approximately maximum winding-portion substantially parallel with the first longitudinal axis; and
the second rotor winding has a shape that provides an approximately maximum winding-portion substantially parallel with the second longitudinal axis.

8. An actuator assembly for positioning a read/write head relative to a surface of a rotating storage disk of a storage disk system, the actuator assembly comprising:
an actuator arm having a distal end for supporting the read/write head over the rotating storage disk, the actuator arm adapted to rotate about a central pivot axis; and
an actuator motor including:
rotor windings including:
a first rotor winding positioned for maximizing the torque vector force generated by placing the first rotor winding approximately on a first longitudinal axis, the first longitudinal axis extending orthogonally through the central pivot axis; and
a second rotor winding positioned for maximizing the torque vector force generated by placing the second rotor winding approximately on a second longitudinal axis, the second longitudinal axis extending orthogonally through the central pivot axis, the rotor windings are oriented orthogonal to pivotal motion of the actuator arm, the pivotal motion being parallel to the rotating storage disk, and the rotor windings comprise electrically conductive material and are positioned in a gap formed between the stator magnets, the rotor windings are positioned in close proximity to a portion of the stator magnets that generates an approximately maximum flux density thereby increasing the linearity of the torque generated by the windings during pivotal motion of the actuator arm;
a stator magnet structure statically mounted in close proximity to the rotor windings, the stator magnet structure including stator magnets; and
a magnetic flux conductive member for providing a closed flux return path through the rotor windings and the stator magnet structure.

9. The actuator assembly of claim 8, wherein the stator magnet structure has two stator magnets, the stator magnets have flat planar surfaces, the flat planar surfaces are aligned to substantially face each other and form a small gap therebetween.

10. The actuator assembly of claim 8, wherein the magnetic flux conductive member includes a segment of flux conductive material positioned in the gap formed between the stator magnets, the segment of flux conductive material being encircled by the rotor windings positioned within the gap.

11. An actuator assembly for positioning a read/write head relative to a surface of a rotating storage disk of a storage disk system, the actuator assembly comprising:
an E-block structure including:
a central hub portion, the central hub portion having a central bore therethrough for accepting a mounting means, the E-block structure being pivotal about a central pivot axis over a predefined limited angular range;
a hub-arm portion extending outwardly from the central hub portion;
an actuator arm having a first end mounted on the hub-arm portion and distal end for supporting the read/write head over the rotating storage disk; and
an actuator motor assembly for energizing the E-block structure to position the read/write heads over a multiplicity of data tracks defined on the storage disk, the actuator motor assembly including:
rotor windings including:
a first rotor winding positioned for maximizing the torque vector force generated by placing the first rotor winding approximately on a first longitudinal axis, the first longitudinal axis extending orthogonally through the central pivot axis; and
a second rotor winding positioned for maximizing the torque vector force generated by placing the second rotor winding approximately on a second longitudinal axis, the second longitudinal axis extending orthogonally through the central pivot axis;
a stator magnet structure statically mounted in close proximity to the rotor windings, the stator magnet structure including stator magnets; and
a magnetic flux conductive member for providing a closed flux return path through the rotor windings and the stator magnet structure.

12. The actuator assembly of claim 11, wherein the rotor windings are oriented approximately orthogonal to pivotal motion of the actuator arm, the pivotal motion being approximately parallel to the rotating storage disk.

13. The actuator assembly of claim 12, wherein the rotor windings are separated in a plane approximately parallel to the rotating storage disk by a predetermined angular distance.

14. The actuator assembly of claim 13, wherein the predetermined angular distance of separation of the rotor windings ranges from approximately 46-degrees to approximately 180-degrees.

15. The actuator assembly of claim 12, wherein the rotor windings comprise electrically conductive material and are positioned in a gap formed between the stator magnets, the rotor windings are positioned in close proximity to a portion of the stator magnets that generates an approximately maximum flux density thereby increasing the linearity of the torque generated by the windings during pivotal motion of the actuator arm.

16. The actuator assembly of claim 11, wherein the rotor windings have minimized cross section for providing decreased heating.

17. The actuator assembly of claim 11, wherein each rotor winding conducts a current in an opposite direction from the other for generating a torque vector force in a common direction, the current flows approximately orthogonal to pivotal motion of the actuator arm, the pivotal motion being approximately parallel to the rotating storage disk.

18. The actuator assembly of claim 11, wherein the first rotor winding has a shape that provides an approximately maximum winding-portion substantially parallel with the first longitudinal axis; and the second rotor winding has a shape that provides an approximately maximum winding-portion substantially parallel with the second longitudinal axis.

19. The actuator assembly of claim 15, wherein the stator magnet structure has two stator magnets, the stator magnets have flat planar surfaces, the flat planar surfaces are aligned to substantially face each other and form a small gap therebetween.

20. The actuator assembly of claim 15, wherein the magnetic flux conductive member includes a segment of flux conductive material positioned in the gap formed between the stator magnets, the segment of flux conductive material being encircled by the rotor windings positioned within the gap.

* * * * *